United States Patent
Nakada

(10) Patent No.: US 7,105,192 B1
(45) Date of Patent: Sep. 12, 2006

(54) METHOD AND APPARATUS FOR SEVERING ROOT OF BEAN SPROUT

(76) Inventor: Masahiro Nakada, 5944 Dixon Ave. West, Dixon, CA (US) 95620

( * ) Notice: Subject to any disclaimer, the term of this patent is extended or adjusted under 35 U.S.C. 154(b) by 35 days.

(21) Appl. No.: 10/807,640

(22) Filed: Mar. 23, 2004

(51) Int. Cl.
A23L 1/00 (2006.01)
A23N 15/00 (2006.01)
A23N 15/12 (2006.01)
A47J 17/06 (2006.01)

(52) U.S. Cl. ............ 426/506; 99/546; 99/643
(58) Field of Classification Search ......... 47/1.01, 47/58.1, 61; 56/1; 99/546; 426/506
See application file for complete search history.

(56) References Cited

U.S. PATENT DOCUMENTS

| 4,327,538 | A | * | 5/1982 | Milhem et al. ............ 56/1 |
| 4,367,675 | A | * | 1/1983 | Boots ............ 99/546 |
| 5,042,195 | A | * | 8/1991 | Lee et al. ............ 47/61 |
| 5,452,651 | A | * | 9/1995 | Pao-Seng ............ 99/546 |
| 6,125,745 | A | * | 10/2000 | Kawakami ............ 99/643 |
| 6,346,288 | B1 | * | 2/2002 | Nakada ............ 426/506 |
| 6,379,732 | B1 | * | 4/2002 | Nakada ............ 426/506 |
| 6,544,572 | B1 | * | 4/2003 | Nakada ............ 426/506 |

FOREIGN PATENT DOCUMENTS

| EP | 998856 A1 | * | 5/2000 |
| JP | 2000270827 A | * | 10/2000 |
| JP | 2003038150 A | * | 2/2003 |
| JP | 2003144120 A | * | 5/2003 |
| JP | 2003220591 A | * | 8/2003 |
| JP | 2003310229 A | * | 11/2003 |
| JP | 2005270091 A | * | 10/2005 |

* cited by examiner

Primary Examiner—Francis T. Palo
(74) Attorney, Agent, or Firm—Weintraub Genshlea Chediak; Bernhard Kreten

(57) ABSTRACT

In a method and apparatus for severing roots of bean sprouts, a severing table has a plurality of ridges formed at predetermined intervals and extending in parallel with a direction in which a cutter blade is moved. Each ridge is formed with a number of severing slits each of which has such a width that a root of a bean sprout falls into each severing slit. The bean sprouts are continuously supplied onto the severing table while a cutter blade is moved along an upper face of the severing table and water is being sprinkled over the severing table so that roots of the bean sprouts on the severing table flow into the severing slits. The roots of the bean sprouts fallen in the severing slits are severed by the cutter blade. The bean sprouts from which the roots have been severed are conveyed out of the severing table with movement of the cutter blade.

2 Claims, 5 Drawing Sheets

METHOD AND APPARATUS FOR SEVERING ROOT OF BEAN SPROUT

BACKGROUND OF THE INVENTION

1. Field of the Invention

The present invention relates to a method and apparatus for severing roots of bean sprouts.

2. Description of the Related Art

Roots of bean sprouts harvested are typically cut off for improvement in their appearances and resultant increase in the commodity quality before the bean sprouts are bagged to be shipped. The inventor developed apparatus for severing roots of bean sprouts as disclosed in U.S. Pat. Nos. 6,346,288 and 6,379,732, in order to automate cutting off bean sprouts. In these apparatus, bean sprouts are supplied onto a flat severing table and water is sprinkled onto the severing table so that while a cutter blade is moved along an upper side of the severing table having a number of severing slits each of which has such a width that a root of a bean sprout falls into each severing slit. Alternatively, air is caused to blow from above the severing table so that a flow of air flowing downward through the severing slits is produced to cause the roots of the bean sprouts on the severing table to fall into the severing slits. The roots of the bean sprouts fallen in the severing slits are severed by the cutter blade.

The inventor has found the following problem in the course of severing roots of a number of bean sprouts using the above-mentioned severing apparatus. The roots of bean sprouts are generally strong. Accordingly, only distal end side slender portions of the bean sprout roots fall into the severing slits just when water is sprinkled onto or air is caused to blow onto the bean sprouts from above. Thick portions of the bean sprout roots in the vicinity of sprouts are hard to bend and to urge into the severing slits. Furthermore, when the bean sprouts on the severing table are scraped up by the cutter blade to be stacked, the bean sprouts of an upper layer of the pile are hard to urge into the severing slits and accordingly cannot be severed. As a result, since the number of bean sprouts whose distal end slender portions of the roots have been severed is increased, it is difficult to sever all roots of bean sprouts efficiently and cleanly.

SUMMARY OF THE INVENTION

Therefore, an object of the present invention is to provide a method and an apparatus for severing roots of bean sprouts, in each of which the overall roots of the bean sprouts can be severed efficiently and cleanly.

To achieve the object, in the present invention, a plurality of ridges are formed on a severing table at predetermined intervals. The ridges extend in parallel with a direction in which a cutter blade is moved. Each ridge is formed with a number of severing slits each of which has such a width that a root of a bean sprout falls into each severing slit. The cutter blade is formed to be fitted with each ridge. The bean sprouts are supplied onto the severing table while a cutter blade is moved along an upper face of the severing table. Water is sprinkled over the severing table or air is caused to blow from above the severing table so that a flow of water or air flowing through the severing slits is produced thereby to cause the roots of the bean sprouts on the severing table to flow into the severing slits. The bean sprouts from which the roots have been severed are conveyed off of the severing table with movement of the cutter blade.

Thus, a flow of water or air flowing from the flat portion between each ridge through the severing slits can be produced when the severing slits are formed in the ridges formed in the severing table. Accordingly, even when thick portions of the bean sprout roots in the vicinity of sprouts are hard to bend and to urge into the severing slits, the roots of the bean sprouts stacked sideways on each flat portion between the ridges easily fall into the severing slits of each ridge from the sides of each ridge while the bean sprouts remain in the sideways state. Further, even when the bean sprouts are scraped up by the cutter blade thereby to be stacked high, the bean sprouts of upper layers fall into the severing slits with the flow of water or air from the sides of each ridge as well as those of the lower layers while remaining in sideways state. Consequently, since entire roots of the bean sprouts stacked sideways on the flat portions between the ridges easily to fall into the severing slits, the entire roots of the bean sprouts can be severed efficiently cleanly.

A leaf of the bean sprout generally has a thickness smaller than its sprout and has such a size as to fall into the severing slit. Accordingly, the leaves of the bean sprouts can also be severed. Further, the bean sprouts are gradually rendered uniformly parallel to the cutter blade in the course of pushing the bean sprouts on the severing table by the cutter blade.

In view of these respects, the severing table preferably includes a flat portion between each ridge and the adjacent ridge, and each flat portion has a width substantially equal to or slightly larger than a length of a sprout of each bean sprout. As the result of the construction, a flow of water or air causes the roots of the bean sprouts to easily fall into the severing slits in one side of each ridge at the side of each flat portion of the severing table and also the leaves of the bean sprouts to fall into the severing slits in one side of the adjacent ridge at the opposite side of the each flat portion of the severing table in the course of pushing the bean sprouts on the severing table by the cutter blade. Thus, the leaves of the bean sprouts can be severed efficiently as well as the roots of the bean sprouts. Consequently, products of only the sprouts of bean sprouts from which roots and leaves have been removed cleanly can be produced efficiently.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

A first embodiment of the present invention will be described with reference to FIGS. 1 to 4. Firstly, the construction of the root severing apparatus will be described. The apparatus comprises a severing table 11 made by pressing a metal plate such as a stainless steel plate. The severing table 11 has a plurality of ridges 12 formed thereon at predetermined intervals and extending in parallel with a direction in which a cutter blade 14 which will be described later is moved. Each ridge 12 has a generally $\Lambda$-shaped section, for example. An apex of each ridge 12 is chamfered or rounded so that bean sprouts supplied from over each ridge easily slide it off. The section of each ridge 12 should not be limited to the $\Lambda$-shaped but may be formed into the shape of a curved convex such as an arcuate shape or an inverted U-shape.

Figure 1:
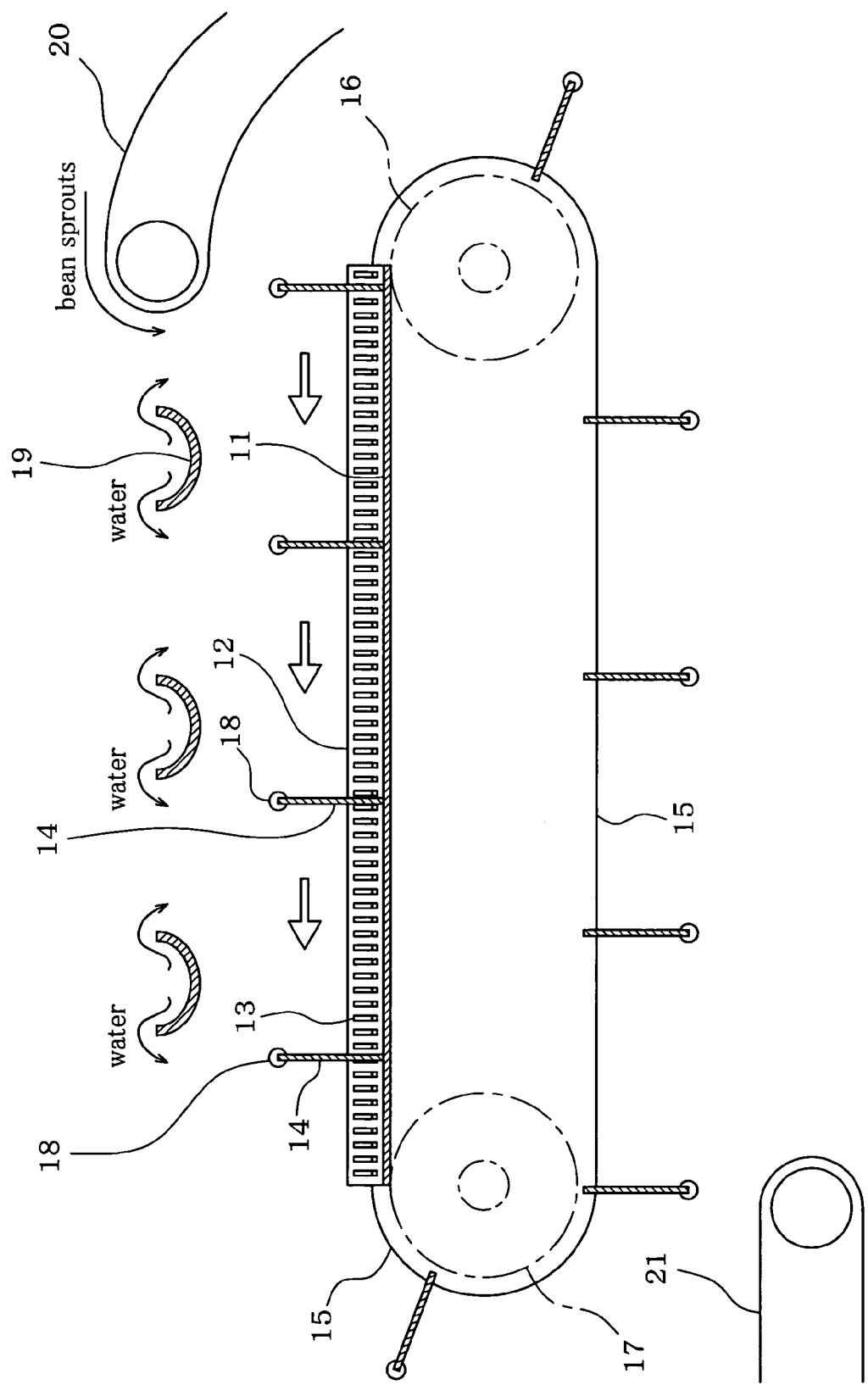
FIG. 1 is a front view of the root severing apparatus used in a first embodiment of the present invention.
Figure 2:
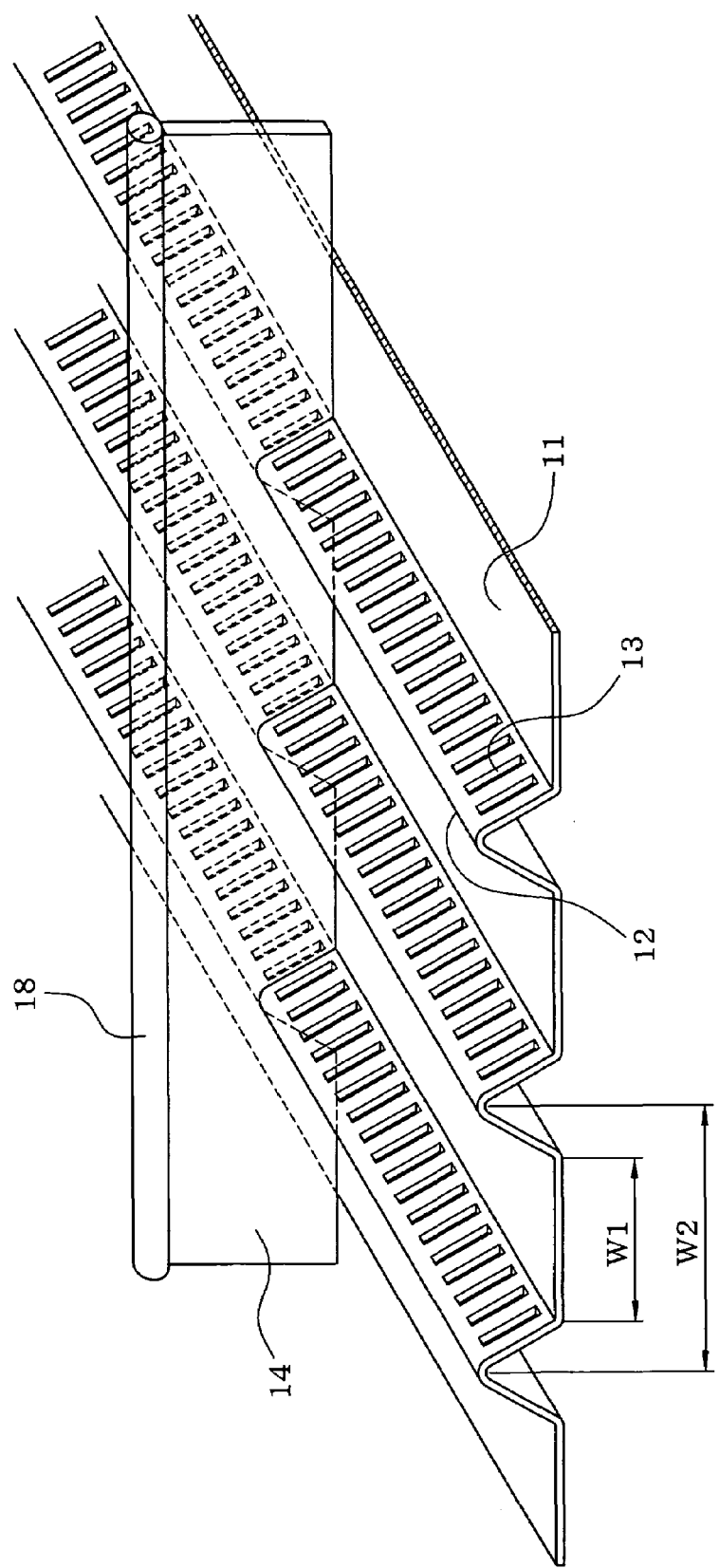
FIG. 2 is a partial perspective view of the severing table and a cutter blade of the root severing apparatus.
Figure 3:
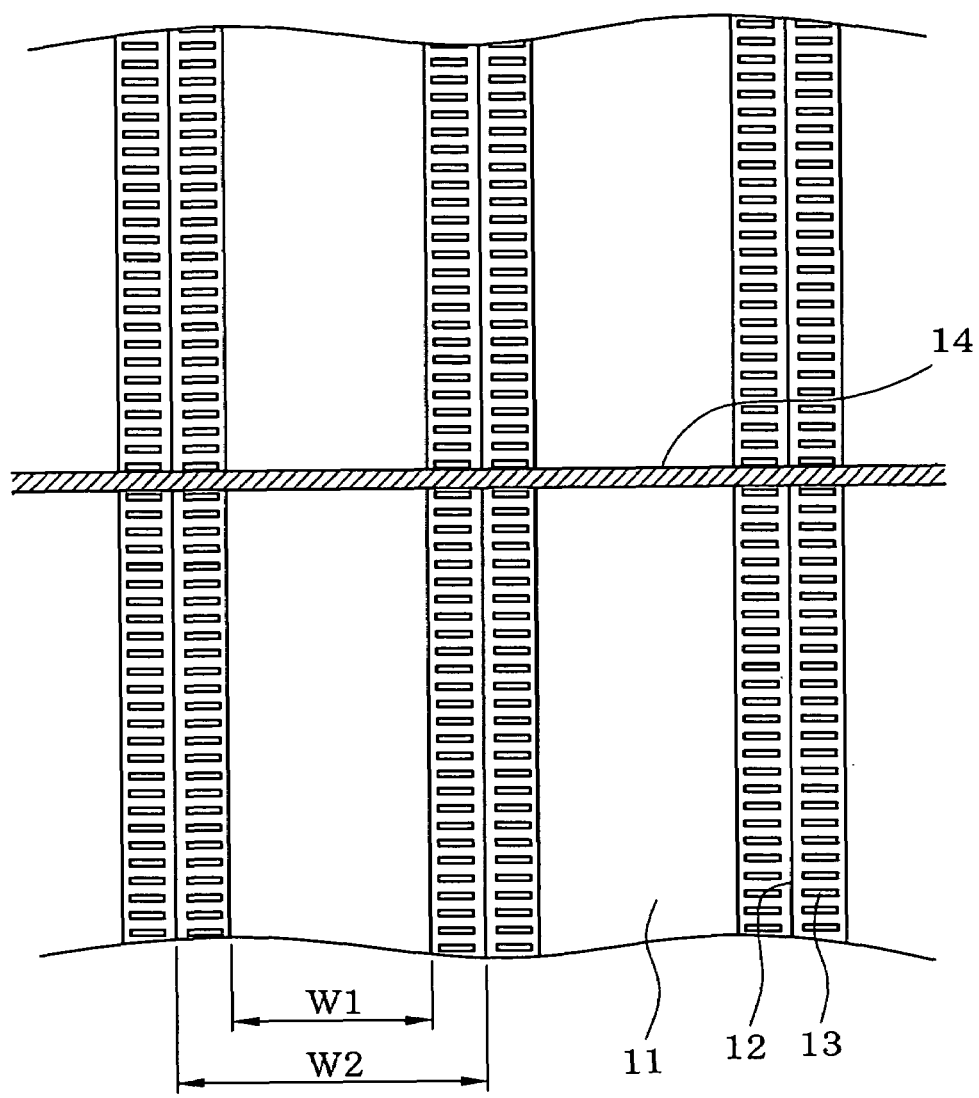
FIG. 3 is a partial plan view of the severing table.
Figure 4:
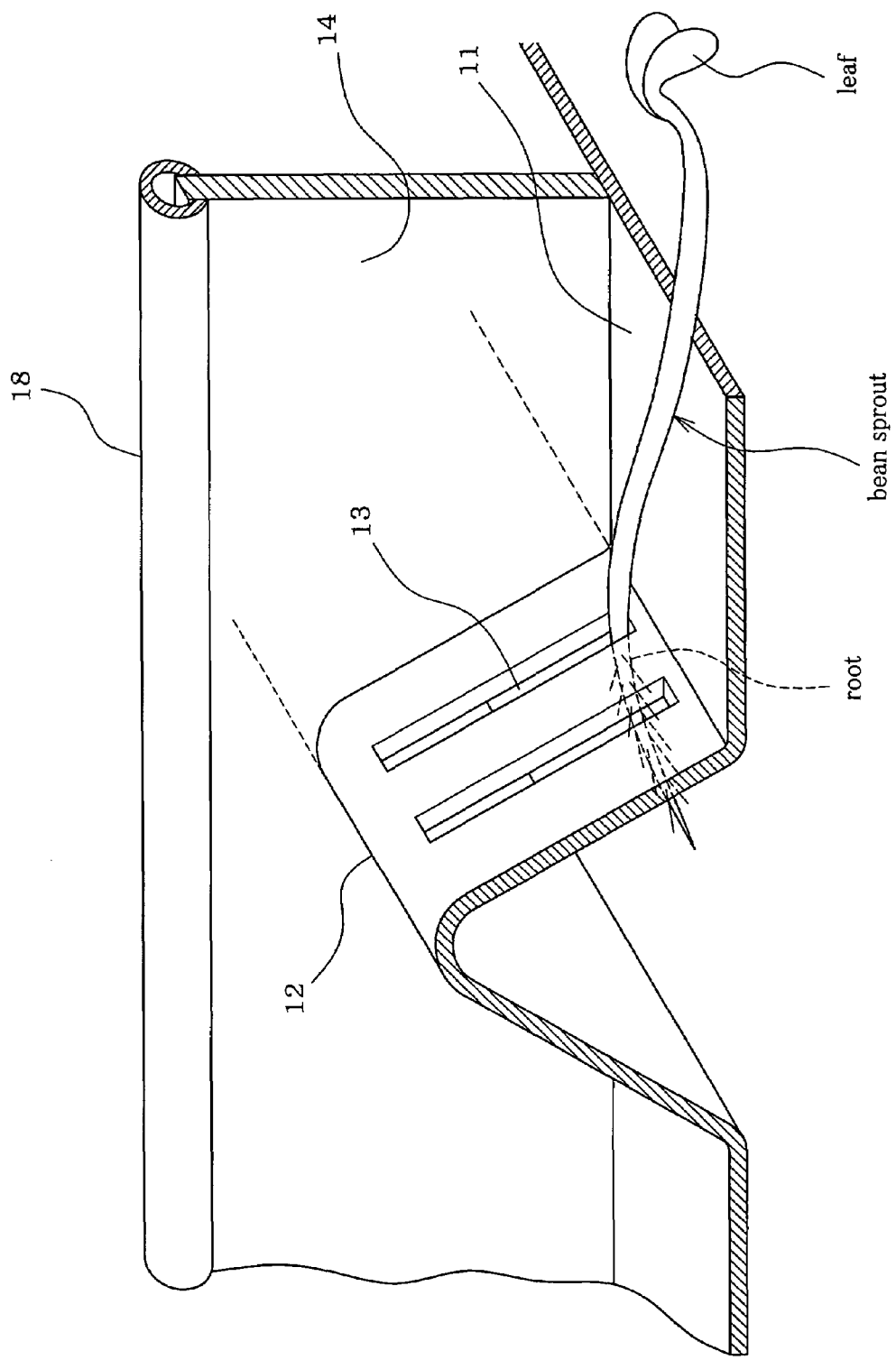
FIG. 4 is a partial perspective view of the severing table and the cutter blade in the case where the root is severed from the bean sprout.

Referring now to FIGS. 2 to 4, each ridge 12 has two inclined faces at both sides respectively. Each ridge 12 has a number of severing slits 13 formed therein at regular intervals along the direction in which the cutter blade 14 is moved. Each severing slit extends in a direction perpendicular to the direction in which the cutter blade 14 is moved (in a direction in parallel to a face of the cutter blade 14). Each severing slit 13 may be formed so as to obliquely cross under the cutter blade 14.

Each severing slit 13 has such a width that a root and a leaf of the bean sprout are allowed to fall thereinto. More specifically, the width of each severing slit 13 is set at a suitable value in a range from about 50% to about 90% of the thickness of the sprout of the bean sprout. For example, the width of each severing slit 13 ranges from 2 to 3.5 mm when the sprout of the bean sprout is about 4 mm thick.

The sprouts of the bean sprouts fallen on the apex of each ridge 12 from over the severing table 11 need to be prevented from colliding against the edge of each severing slit 13 thereby to be damaged. For this purpose, no severing slits 13 are formed in the apex of each ridge 12. Further, each flat portion between the ridges 12 has no severing slits 13.

In the first embodiment, each flat portion between the ridges 12 has a width W1 substantially equal to or slightly larger than the length of a sprout of each bean sprout. Further, an interval W2 between the apexes of each ridge 12 and the adjacent one is set to be substantially equal to or slightly larger than the length of the whole bean sprout including the root and the leaves.

A plurality of cutter blades 14 are disposed at regular intervals on the severing table 11. Each cutter blade 14 is formed into such a shape that it is fitted with each ridge. Each cutter blade 14 is coupled to a chain 15 (a cutter driving unit). The chain 15 extends between two sprockets 16 and 17 disposed at entrance and exit sides of the severing table 11 respectively. The chain 15 is turned by an electric motor (not shown) so that each cutter blade 14 is moved along an upper side of the severing table 11 in a direction perpendicular to the severing slits 13 (the direction in which the ridges 12 extend). At this time, each cutter blade 14 is moved while being in a slight sliding contact with the corresponding ridge 12 and the flat portion of the severing table 11 or while a small clearance is formed therebetween, whereupon the roots of the bean sprouts having fallen in the severing slits 13 of each ridge 12 are severed by the cutter blade 14, as shown in FIG. 4. Each cutter blade 14 has an upper edge provided with a generally pipe-shaped slipping unit 18 for slipping the bean sprouts off.

A plurality of sprinkling tubs 19 (sprinkling units) are disposed at regular intervals over the severing table 11. Each sprinkling tub 19 serves as a sprinkling unit for sprinkling water over the severing table 11. Water is supplied into each sprinkling tub 19, which is caused to overflow so that water is sprinkled over the severing table 11. A bean sprout supply conveyor 20 (a bean sprout supply unit) serving as a bean sprout supplying unit is provided at the entrance side of the severing table 11. Bean sprouts are continuously supplied onto the severing table 11 by the bean sprout supply conveyor 20. Further, a carrying conveyor 21 is provided at the exit side of the severing table 11 for carrying the bean sprouts scraped off of the severing table 11 by the movement of each cutter blade 14.

During operation of the root severing apparatus thus constructed, the chain 15 is turned by the motor so that each cutter blade 14 is moved along the upper side of the severing table 11 in the direction perpendicular to the severing slits 13 (the direction in which the ridges 12 extend). Further, water is supplied into each sprinkling tub 19 so that each sprinkling tub 19 overflows. The bean sprouts are continuously supplied onto the severing table 11 by the bean sprout supply conveyor 20 while water is sprinkled over the severing table 11.

The bean sprouts are gradually rendered uniformly parallel to the cutter blade 14 in the course of pushing the bean sprouts on the severing table 11 by the cutter blade 14. Further, the water sprinkled over the severing table 11 flows through the severing slits 13 of each ridge 12. Accordingly, a flow of water is established flowing from the flat portion between the ridges 12 toward the severing slits 13 of each ridge 12.

Even when thick portions of the bean sprout roots in the vicinity of sprouts are hard to bend, the roots of the bean sprouts stacked sideways on each flat portion between the ridges 12 of the severing table 11 easily fall into the severing slits 13 of each ridge 12 from the sides of each ridge while the bean sprouts remain in the sideways state. Further, even when the bean sprouts are scraped up by the cutter blade 14 thereby to be stacked high, the bean sprouts of upper layers fall into the severing slits 13 with the flow of water from the sides of each ridge 12 as well as those of the lower layers while remaining the sideways state. Consequently, since entire roots of the bean sprouts stacked sideways on the flat portions between the ridges 12 become easy to fall into the severing slits 13, the entire roots of the bean sprouts can be severed efficiently and cleanly.

In the first embodiment, each flat portion between the ridges 12 has the width W1 substantially equal to or slightly larger than the length of a sprout of each bean sprout. As the result of the construction, a flow of water causes the roots of the bean sprouts to easily fall into the severing slits 13 in one side of each ridge 12 at the side of each flat portion of the severing table 11 and also the leaves of the bean sprouts to fall into the severing slits 13 in one side of the adjacent ridge at the opposite side of the each flat portion of the severing table 11 in the course of pushing the bean sprouts on the severing table 11 by the cutter blade 14. Thus, the leaves of the bean sprouts can be severed efficiently as well as the roots of the bean sprouts. Consequently, products of only the sprouts of bean sprouts from which roots and leaves have been removed cleanly can be produced efficiently.

The bean sprouts from which the roots and leaves thereof have been severed on the severing table 11 are scraped onto the carrying conveyor 21 by the movement of the cutter blades 14 to be fed to a subsequent step such as a bean sprout cleaning step. Thus, the cutter blades 14 serve to carry the bean sprouts out of the severing table 11 as well as to sever the roots and leaves of the bean sprouts. Consequently, both severing the roots and leaves of the bean sprouts and carrying the bean sprouts from the severing table 11 can efficiently be performed by the movement of the cutter blades 14 continuously.

The cutter blades 14 may be moved only in the carrying direction or may repeat a forward movement by a first distance and a backward movement by a second distance shorter than the first distance alternately. In this construction, a stack of the bean sprouts on the severing table 11 is broken when the cutter blades 14 are moved backward, whereupon unsevered roots of the bean sprouts can be caused to flow into the severing slits 13. Consequently, the roots of the bean sprouts stacked on the severing table 11 can uniformly be severed. In this case, a ratio of the forward distance to the backward distance is, for example, 2:1, 3:1, 4:1 or the like.

In the first embodiment, no severing slits 13 are formed in each flat portion between the ridges 12 of the severing table 11. Accordingly, all the water sprinkled over the severing table 11 flows out through the severing slits 13 of each ridge 12. As a result, a flow of water flowing from both sides of each ridge 12 toward the severing slits 13 of each ridge 12 is intensified such that the effect of causing the roots and leaves of the bean sprouts to fall into the severing slits 13 can be increased advantageously.

However, the bean sprouts supplied in a large amount onto the severing table 11 include those passing through a central part of the flat portion between the ridges 12 to the end. In view of this, severing slits may be formed in the flat portion between the ridges 12 so that the roots of the bean sprouts passing through the central part of the flat portion between the ridges 12 can be severed. Even in this case, a sufficient flow of water flowing toward the severing slots 13 of each ridge 12 can be ensured when an amount of water sprinkled over the severing table 11 is increased. Consequently, the roots and leaves of the bean sprouts can efficiently be caused to fall into the severing slits 13 of the ridges 12 to be severed.

Further, in the first embodiment, the apex of each ridge 12 is rounded so that the bean sprouts supplied from over the severing table 11 easily slip down. Consequently, the bean sprouts can be prevented from being caught on the apexes thereby to be damaged. Moreover, since no severing slits 13 are formed in the apex of each ridge 12, the sprouts of the bean sprouts fallen on the apexes of the ridges 12 can advantageously be prevented from striking against the edge of each severing slit 13 thereby to be damaged.

Figure 5:
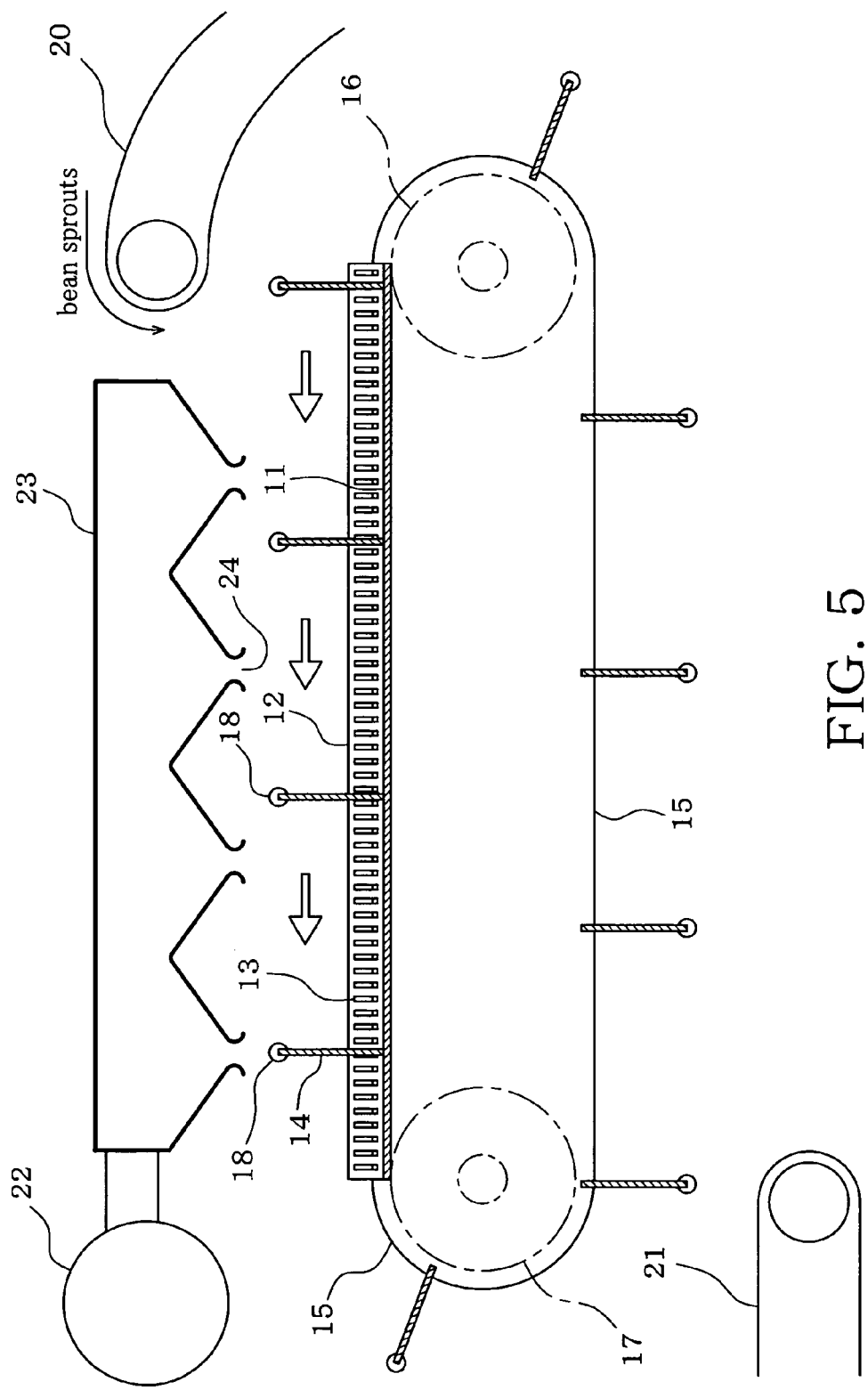
FIG. 5 is a front view of the root severing apparatus used in a second embodiment of the invention.

A second embodiment of the invention will now be described with reference to FIG. 5. In the first embodiment, water is sprinkled over the severing table 11 so that the flow of water is established flowing from the flat portion between the ridges 12 toward the severing slits 13 of each ridge 12, so that the roots and leaves of the bean sprouts are caused to fall into the severing slits 13 of each ridge 12. In the second embodiment, however, air is caused to blow from above the severing table 11 so that a flow of air flowing from each flat portion between the ridges 12 through the severing slits 13 of each ridge 12 is produced thereby to cause the roots of the bean sprouts on the severing table 11 to flow into the severing slits 13.

The root severing apparatus in the second embodiment is provided with a blower casing 23 connected to a discharge port of a blower 22 over the severing table 11, instead of the sprinkling tubs 19 (the sprinkling unit). The blower casing 23 has a plurality of air outlets 24 formed in the backside of the blower 22. Air from the air outlets 24 is caused to blow substantially against the overall surface of the severing table 11. The blower 22 and the blower casing 23 constitute a blowing unit. In the other respects, the construction of the root severing apparatus in the second embodiment is the same as that in the first embodiment.

During operation of the root severing apparatus thus constructed, the chain 15 is turned by the motor so that each cutter blade 14 is moved along the upper side of the severing table 11 in the direction perpendicular to the severing slits 13 (the direction in which the ridges 12 extend). Further, the bean sprouts having been washed with water are continuously supplied onto the severing table 11 by the bean sprout supply conveyor 20 while the blower 22 is operated so that air from the air outlets 24 is caused to blow substantially against the overall surface of the severing table 11.

Air blown against the severing table 11 flows from each flat portion between the ridges 12 through the severing slits 13 of each ridge 12. Accordingly, the roots and leaves of the bean sprouts supplied onto the severing table 11 are caused to flow into the severing slits 13 with the air flowing from the sides of each ridge 12 toward the severing slits 13 of each ridge 12 and then severed by each cutter blade 14. Furthermore, water adherent to the bean sprouts is blown away downward from the severing slits 13 by the wind pressure, whereby the bean sprouts are dewatered. Consequently, since the severing of the roots and leaves of the bean sprouts and the dewatering are efficiently performed simultaneously, the quality of the bean sprouts can be improved with improvement in the productivity.

The bean sprouts from which the roots and leaves thereof have been severed on the severing table 11 are scraped onto the carrying conveyor 21 by the movement of the cutter blades 14 to be fed to a subsequent step such as a bean sprout packaging step.

The severing table 11 is made by pressing a metal plate such as a stainless steel plate in each of the first and second embodiments. However, the severing table may be made by arranging bar-shaped members each formed with the ridges, at regular intervals of clearance corresponding to the severing slit so that the clearance between the bar-shaped members serves as the severing slit.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A method of severing roots of bean sprouts using a severing table on which a plurality of ridges are formed at predetermined intervals, the ridges extending in parallel with a direction in which a cutter blade is moved, each ridge being formed with a number of severing slits each of which has such a width that a root of a bean sprout falls into each severing slit, the cutter blade being formed to be fitted with each ridge, the method comprising:

supplying the bean sprouts onto the severing table while a cutter blade is moved along an upper face of the severing table;

sprinkling water over the severing table so that roots of the bean sprouts on the severing table flow into the severing slits;

severing the roots of the bean sprouts urged into the severing slits by a cutter blade; and conveying the bean sprouts from which the roots have been severed, off of the severing table with movement of the cutter blade.

2. The method according to claim 1, wherein the severing table includes a flat portion between each ridge and the adjacent ridge, and each flat portion has a width substantially equal to or slightly larger than a length of a sprout of each bean sprout.

* * * * *